United States Patent
Teh et al.

(10) Patent No.: US 11,188,255 B2
(45) Date of Patent: Nov. 30, 2021

(54) DYNAMIC MAJOR MODE FOR EFFICIENT MEMORY TRAFFIC CONTROL

(71) Applicant: Intel Corporation, Santa Clara, CA (US)

(72) Inventors: Chee Hak Teh, Bayan Lepas (MY); Yu Ying Ong, Ampang (MY); Kevin Chao Ing Teoh, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 15/938,740

(22) Filed: Mar. 28, 2018

(65) Prior Publication Data

US 2019/0303039 A1    Oct. 3, 2019

(51) Int. Cl.
| | |
|---|---|
| *G06F 12/00* | (2006.01) |
| *G06F 3/06* | (2006.01) |
| *G06F 13/16* | (2006.01) |
| *G06F 13/00* | (2006.01) |
| *G06F 13/28* | (2006.01) |

(52) U.S. Cl.
CPC .......... *G06F 3/0659* (2013.01); *G06F 3/0604* (2013.01); *G06F 3/067* (2013.01); *G06F 3/0653* (2013.01); *G06F 13/1642* (2013.01); *G06F 13/1668* (2013.01)

(58) Field of Classification Search
CPC .. G06F 3/0659; G06F 3/0604; G06F 13/1642; G06F 3/067; G06F 13/1668; G06F 3/0653
See application file for complete search history.

(56) References Cited

U.S. PATENT DOCUMENTS

| | | | |
|---|---|---|---|
| 5,613,003 | A | 3/1997 | Bridgewater et al. |
| 6,772,352 | B1 | 8/2004 | Williams et al. |
| 7,991,963 | B2 | 8/2011 | Steiner et al. |
| 8,098,512 | B2 | 1/2012 | Parkinson et al. |
| 8,429,367 | B2 | 4/2013 | Alexander et al. |
| 9,418,013 | B2 | 8/2016 | Anantaraman et al. |
| 2006/0156091 | A1 | 7/2006 | Aipperspach et al. |
| 2015/0248295 | A1* | 9/2015 | Michalak ............ G06F 11/3024 712/216 |
| 2019/0196996 | A1* | 6/2019 | Balakrishnan ...... G06F 13/1668 |
| 2020/0112608 | A1* | 4/2020 | Patel ................... H04L 67/1008 |

\* cited by examiner

*Primary Examiner* — Mark A Giardino, Jr.

(57) ABSTRACT

An integrated circuit may include a memory controller circuit for communicating with an off-chip memory device. The memory controller is operable in a read-write major mode that is capable of dynamically adapting to any memory traffic pattern, which results in improved memory scheduling efficiency across different user applications. The memory controller may include at least a write command queue, a read command queue, an arbiter, and a command scheduler. The command scheduler may monitor a write command count, a read command count, a write stall count, and a read stall count to determine whether to dynamically adjust a read burst threshold setting and a write burst threshold setting.

21 Claims, 9 Drawing Sheets

DYNAMIC MAJOR MODE FOR EFFICIENT MEMORY TRAFFIC CONTROL

BACKGROUND

This relates generally to integrated circuits and more particularly, to integrated circuits configured to interface with memory components.

In an effort to improve speed, an integrated circuit die and an accompanying memory die can be formed in a single multichip package. The integrated circuit die includes a memory controller configured to interface with the memory die. To help achieve satisfactory command scheduling efficiency, the memory controller typically groups read and write transactions to be scheduled together to help reduce bus turnaround time. Such types of memory controllers will schedule X memory read transactions followed by Y memory write transactions before repeating the memory read transactions. This type of scheduling scheme is sometimes referred to as a read-write major mode with a read-write ratio of X:Y.

The conventional read-write major mode has several drawbacks. First, the efficiency of the memory subsystem depends heavily on whether the read-write ratio (i.e., X:Y) matches the actual memory traffic ratio. A mismatched ratio can result in up to 20% or more efficiency degradation. Second, the read-write ratio is typically tuned to provide optimum performance for specific memory traffic patterns. If, however, the memory subsystem receives other memory traffic patterns, memory performance will be degraded. Predicting traffic patterns in reconfigurable integrated circuits such as programmable logic devices is even more challenging.

It is within this context that the embodiments described herein arise.

DETAILED DESCRIPTION

The present embodiments relate to methods of operating a memory controller to facilitate live memory traffic monitoring, which allows for read-write major mode to dynamically adapt to changing memory traffic conditions. The read-write major mode will schedule R memory read transactions followed by W memory write transactions before repeating the memory read transactions.

Dynamically adjusting the read-write ratio (R:W) negates the need for accurately tuning the R:W ratio at startup, which also helps improve the efficiency of the memory scheduler to handle different memory traffic patterns (e.g., to prevent efficiency degradation due to burst-idle memory traffic scenarios). Other technical advantages include improved usability for circuit designers since designers no longer need to finetune the memory controller to support specific memory traffic patterns unique to their particular application, as well as providing improved adaptability for supporting future enhancements (e.g., by providing only firmware algorithm updates without having to spin silicon).

It will be recognized by one skilled in the art, that the present exemplary embodiments may be practiced without some or all of these specific details. In other instances, well-known operations have not been described in detail in order not to unnecessarily obscure the present embodiments.

Figure 1:
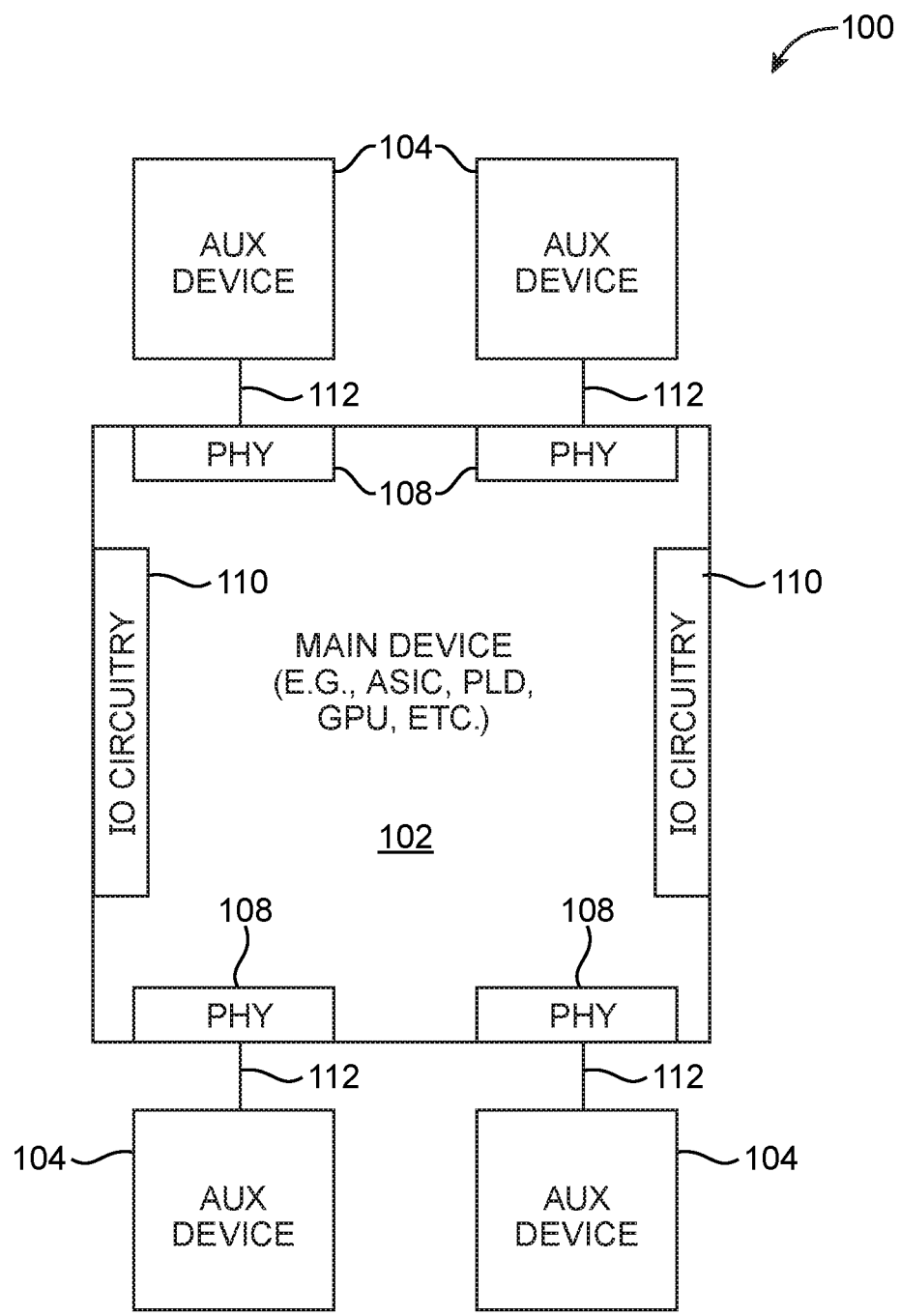
FIG. 1 is a diagram of an illustrative system that includes a main integrated circuit die coupled to multiple auxiliary devices in accordance with an embodiment.

FIG. 1 shows an illustrated integrated circuit system such as system 100. As shown in FIG. 1, integrated circuit 100 may include a main integrated circuit die 102 that is coupled to multiple auxiliary integrated circuit dies 104. Die 102, which may be a programmable integrated circuit (e.g., a programmable logic device, a field-programmable gate array, etc.), an application-specific integrated circuit (ASIC), a central processing unit (CPU), a graphics processing unit (GPU), or other suitable integrated circuit, may serve as a primary processor for system 100 and may therefore sometimes be referred to herein as the main device. The auxiliary devices 104 that communicate with the main device are sometimes referred to as daughter components.

In one suitable configuration, main device 102 and auxiliary devices 104 are formed on the same integrated circuit package (sometimes referred to as a multichip package). Device 102 may include transceivers and/or other input-output (IO) components 110 for interfacing with devices external to the multichip package. Main device 102 may also include physical-layer ("PHY") interface circuitry such as PHY circuits 108 configured to communicate with the auxiliary devices 104 via inter-die traces 112. The example in which main device 102 and auxiliary devices 104 are formed on a single multichip package is merely illustrative and does not serve to limit the scope of the present embodiments. If desired, main device 102 and auxiliary devices 104 may be part of different integrated packages and can be mounted on the same printed circuit board or on different printed circuit boards.

In accordance with an embodiment, at least one auxiliary device 104 may be a memory chip (e.g., one or more memory devices stacked on top of one another) that is implemented using random-access memory such as static random-access memory (SRAM), dynamic random-access memory (DRAM), low latency DRAM (LLDRAM), reduced latency DRAM (RLDRAM), or other types of volatile memory. If desired, each auxiliary memory device 104 may also be implemented using nonvolatile memory (e.g., fuse-based memory, antifuse-based memory, electrically-programmable read-only memory, etc.). Each auxiliary component 104 that serves as a memory/storage component may sometimes referred to as a memory element.

Each circuit 108 may serve as a physical-layer bridging interface between an associated memory controller on main device 102 and one or more high-bandwidth channels coupled to an associated memory element 104. The memory controller(s) on device 102 may be a non-reconfigurable "hard" memory controller or a reconfigurable "soft" memory controller logic. In such configurations, each PHY circuit 108 can be used to support multiple parallel channel interfaces such as the JEDEC High Bandwidth Memory (HBM) DRAM interface or the Quad Data Rate (QDR) wide IO SRAM interface (as examples). Each parallel channel can support single data rate (SDR) or double data rate (DDR) communications. If desired, PHY circuits 108 may also be used to support a plurality of serial IO channel interfaces.

Figure 2:
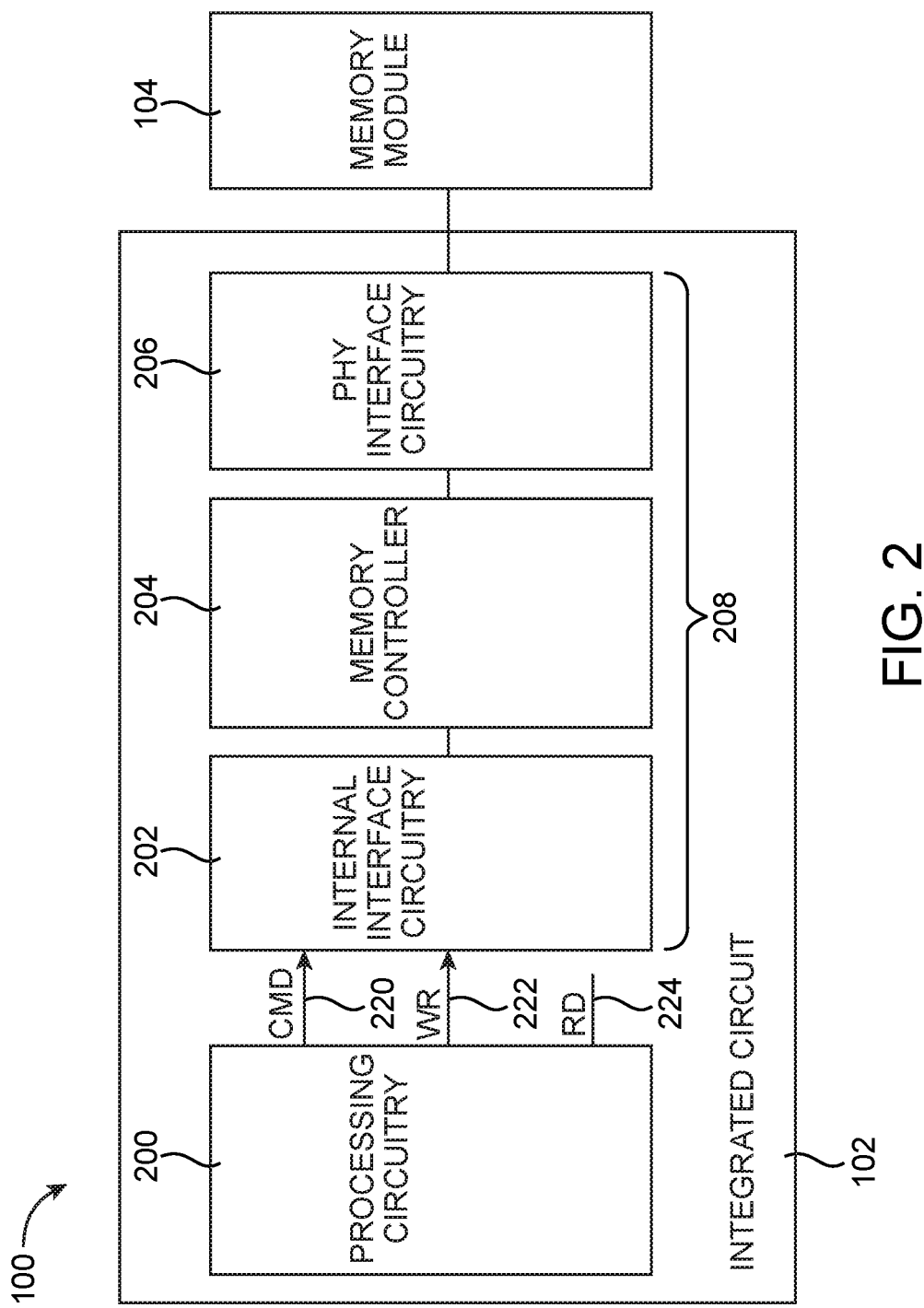
FIG. 2 is a diagram of an illustrative integrated circuit die that includes memory interface circuitry for communicating with external memory in accordance with an embodiment.

FIG. 2 is a diagram showing how system 100 may include main integrated circuit die 102 coupled to an auxiliary memory module 104. Memory module 104 (sometimes referred to as system memory) may be an external, in-package, or embedded memory device sometimes referred to as a single in-line memory module (SIMM) or a dual in-line memory module (DIMM), as examples. In general, device 10 may be configured to communicate with at least two memory modules, at least four memory modules, etc.

Integrated circuit 102 may include processing circuitry 200 and memory interface and control circuitry 208 configured to relay information between processing circuitry 200 and off-chip memory module 104. Processing circuitry 200 may include user logic, embedded microprocessors, digital signal processors (DSP), microcontrollers, specialized processing blocks, arithmetic processing circuits, and/or other processing circuitry. Circuitry 200 may further include random-access memory (RAM), first-in first-out (FIFO) circuitry, stack or last-in first-out (LIFO) circuitry, read-only memory (ROM), content-addressable memory (CAM), or other memory elements.

Memory interface and control circuitry 208 may include internal interface circuitry 202, a memory controller such as memory control circuit 204, and PHY interface circuitry 206. PHY interface circuitry 206 (e.g., PHY circuit 108 shown in FIG. 1) may serve as a physical layer input-output component that physically drives signals off of device 102 to memory module 104 and receives signals from memory module 22 104. Internal interface circuitry 202 may be used to interface with processing logic circuitry 200 to help handle memory access commands generated from processing circuitry 200.

To initiate a memory write operation, processing circuitry 200 may output a write command over path 220 and associated write data signals WR over path 222 to internal interface circuitry 202. The write data signals and associated data strobe, clock, address, and/or other control signals may be passed through to and processed by memory controller 204 and selectively output to memory module 104 via PHY interface 206. To initiate a memory read operation, processing circuitry 200 may output a read command, address, and/or other control signals over path 220 to internal interface circuitry 202. Read data retrieved from memory module 104 may be conveyed from memory module 104 to PHY interface 206. Memory controller 204 may then process the read back and forward the read data (RD) to processing circuitry 200 via internal interface circuitry 202 via return path 224.

Memory interface and control circuitry 208 may also serve to perform desired data rate conversions and to generate signals that meet timing requirements specified by the memory protocol currently under use. The arrangement of FIG. 2 is merely illustrative and is not intended to limit the scope of the present invention. If desired, memory interface and control circuitry 208 may be implemented as an external controller to integrated circuit die 102 (i.e., as a separate standalone memory interface device).

Conventional memory controllers typically groups read and write transactions to be scheduled together to help reduce bus turnaround time. Such types of memory controllers will schedule X memory read transactions followed by Y memory write transactions before repeating the memory read transactions. This type of scheduling scheme is sometimes referred to as a read-write major mode with a read-write ratio of X:Y.

The conventional read-write major mode has several disadvantages. First, the efficiency of the memory subsystem depends heavily on whether the read-write ratio (i.e., X:Y) matches the actual memory traffic ratio. A mismatched ratio can result in up to 20% or more efficiency degradation. Second, the read-write ratio is typically tuned to provide optimum performance for specific memory traffic patterns. If, however, the memory subsystem receives other memory traffic patterns, memory performance will be degraded. Predicting traffic patterns in reconfigurable integrated circuits such as programmable logic devices is even more challenging.

Figure 3:
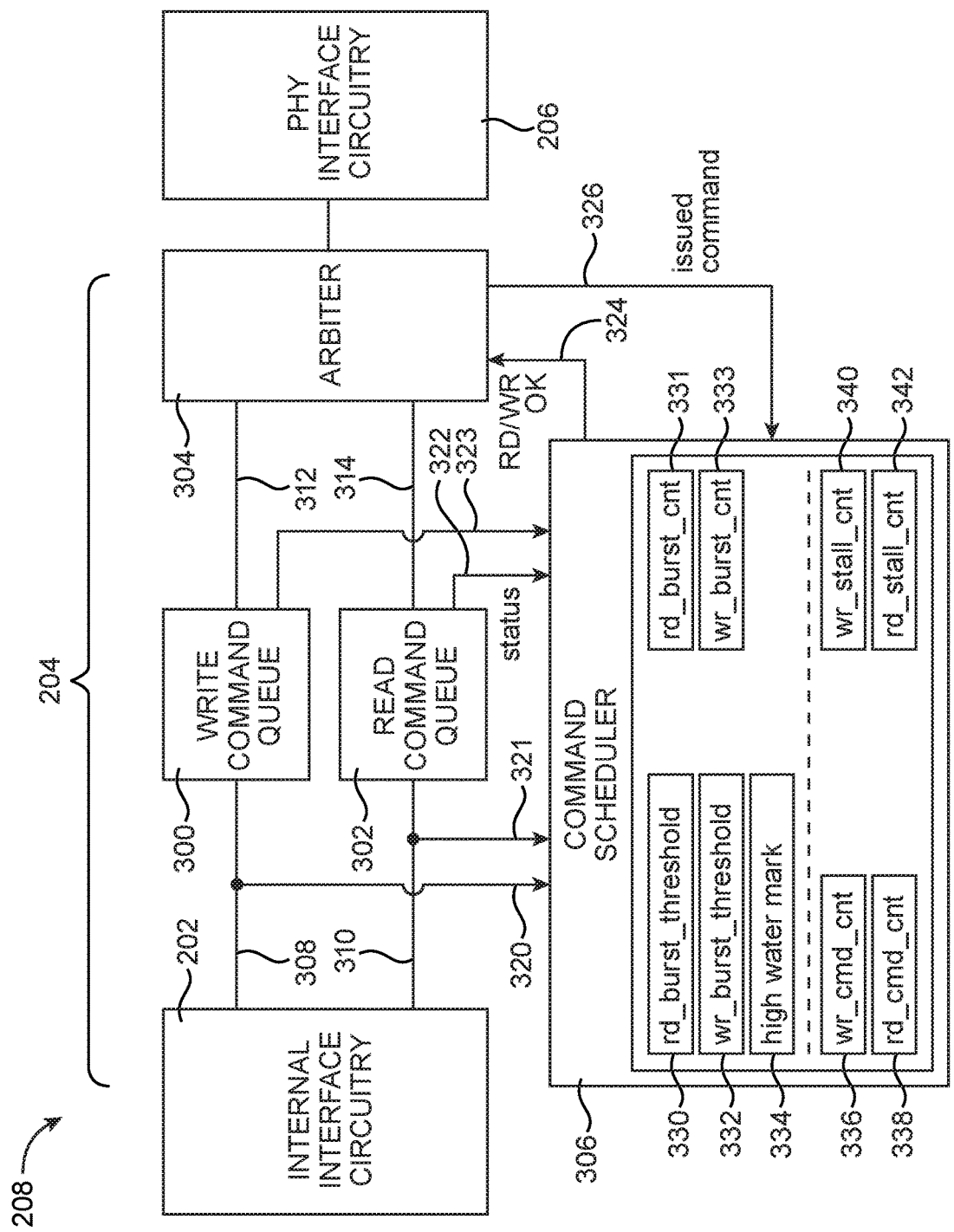
FIG. 3 is a diagram showing an illustrative implementation of a memory controller circuit configured to dynamically adapt to any memory traffic condition in accordance with an embodiment.

FIG. 3 is a diagram showing one illustrative implementation of a memory control circuit 204 configured to support a read-write major mode capable of dynamically adapting to any memory traffic condition, which results in improved scheduling efficiency across different applications. As shown in FIG. 3, memory control circuit 204 may include a write command buffer such as write command queue (WCQ) 300, a read command buffer such as read command queue (RCQ) 302, a read/write command arbiter such as arbitration circuit 304, and a read/write command scheduler such as command scheduling circuit 306. In general, memory controller 204 may further include data buffer circuits, encoder/decoder circuits, timing circuits, rate matching circuits, and/or other suitable control and routing circuits, which are not shown in FIG. 3 to avoid obscuring the present embodiments.

Write command queue 300 can be used to buffer write commands received from internal interface circuitry 202 via path 308. The write commands may include full write commands, partial write commands, read-modify-write (RMW) commands, etc. Write command queue 300 may optionally include a finite state machine that tracks the state of each write request and that updates the state of each request based on grants from arbiter 304. In one suitable arrangement, write command queue 300 may be implemented as a simple buffer that is capable of handling partial write mergers into a single entry and generating additional read requests for read-modify-write operations.

Read command queue 302 can be used to buffer read commands received from internal interface circuitry 202 via path 310. Read command queue 302 may include a finite state machine that tracks the state of each command and that updates the state of each command based on grants from arbiter 304. In one suitable arrangement, read command queue 302 may be implemented as a shift register to maintain the age status of each command to help simplify read/write command arbitration. Arbiter 304 may be configured to perform arbitration between read and write requests and may be controlled by command scheduling circuit 306.

Command scheduling circuit 306 is configured to control the flow of read and write commands via a major mode scheme to reduce turnaround time and increase efficiency. In particular, command scheduler 306 may include the following major mode settings: a read burst threshold setting 330 (rd_burst_threshold), a write burst threshold setting 332 (wr_burst_threshold), and a write high watermark setting 334 (HWM). The read burst threshold setting defines a number of continuous reads that may be issued before issuing a write. Conversely, the write burst threshold setting defines a number of continuous writes that may be issued before issuing a read.

Command scheduler 306 may further include a read burst counter 331 (which outputs rd_burst_cnt) configured to track the number of reads that have been unloaded from read command queue 302 and issued to the memory module (i.e., counter 331 will increment rd_burst_cnt in response to being notified by arbiter 304 via path 326 that a read command has been issued). Command scheduler 306 may further include a write burst counter 333 (which outputs wr_burst_cnt) configured to track the number of writes that have been unloaded from write command queue 300 and issued to the memory module (i.e., counter 333 will increment wr_burst_cnt in response to being notified by arbiter 304 via path 326 that a write command has been issued). Command scheduler 306 may automatically flush accumulated write commands once the number of writes in write command queue 300 reaches the HWM level.

Figure 4:
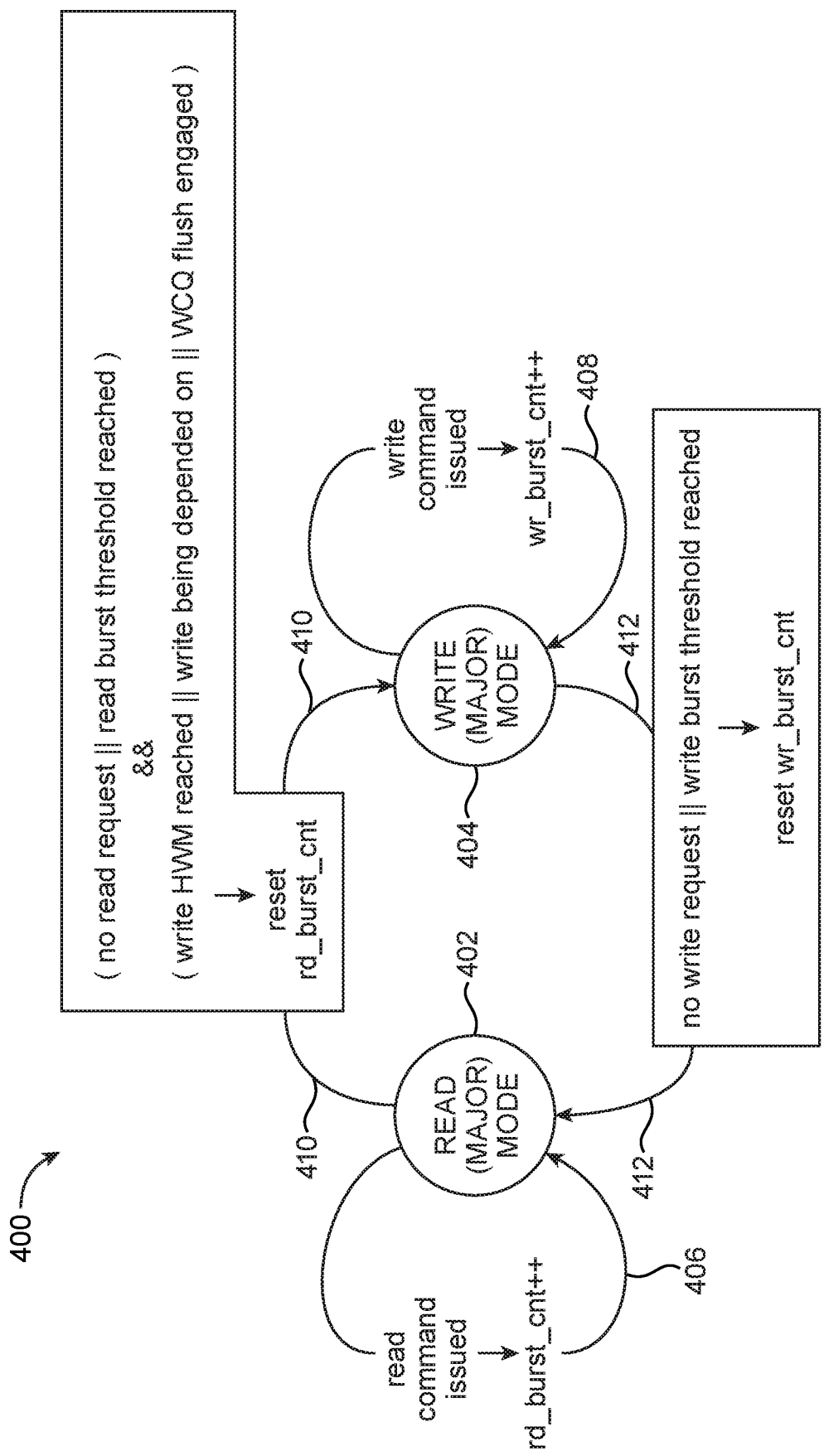
FIG. 4 is a diagram of an illustrative read-write major mode finite state machine in accordance with an embodiment.

FIG. 4 is a diagram of an illustrative read-write major mode finite state machine (FSM) 400 that controls the scheduling of read and write commands using command scheduler 306. As shown in FIG. 4, command scheduler FSM 400 may alternate between a read mode 402 (sometimes referred to as a read major mode) and a write mode 404 (sometimes referred to as a write major mode). At device startup, FSM 400 may be reset to read major mode 402. During read major mode 402, command scheduler 306 will issue a "read ok/enable" signal to arbiter 304 via path 324 (see FIG. 3), thus directing arbiter 304 to issue read commands. Whenever a read command is issued by the arbiter, read burst counter 331 increments rd_burst_cnt, as indicated by path 406.

If there are no read requests or when rd_burst_cnt reaches rd_burst_threshold, and if the HWM level is reached, a write is being depended on (i.e., a conflict condition is detected where a read request is dependent on an in-flight write that has yet to complete), or when a write command queue flush is engaged (i.e., to force the WCQ to flush), read burst counter 331 is reset to set rd_burst_cnt back to zero and FSM 400 will transition to write major mode 404, as indicated by path 410.

During write major mode 404, command scheduler 306 will issue a "write ok/enable" signal to arbiter 304 via path 324, thus directing arbiter 304 to issue write commands. Whenever a write command is issued by the arbiter, write burst counter 333 increments wr_burst_cnt, as indicated by path 408. If there are no write requests or when wr_burst_cnt reaches wr_burst_threshold, write burst counter 333 is reset to set wr_burst_cnt back to zero and FSM 400 will transition back to read major mode 402, as indicated by path 412.

Configured in this way, FSM 400 favors the read mode. If desired, FSM 400 may only switch the scheduling of row commands for read and writes to allow for page hit commands to still be scheduled even if it incurs turnaround time because row switching incurs larger turnaround time and to reduce boundary conditions (e.g., live lock or dead lock situations) where cycles may be blocked by each other due to memory coherency and major mode conflicts.

Command scheduler 306 may be configured to support a dynamic major mode, where the read burst threshold and the write burst threshold can be updated in real time based on incoming traffic patterns. To achieve this, command scheduler 306 of FIG. 3 may further be provided with a write command counter 336 (which outputs wr_cmd_cnt), a read command counter 338 (which outputs rd_cmd_cnt), a write stall counter 340 (which outputs wr_stall_cnt), and a read stall counter 342 (which outputs rd_stall_cnt).

Write command counter 336 increments wr_cmd_cnt whenever a write command is accepted by the memory controller (i.e., whenever a write command is loaded into the write command queue). For example, command scheduler 306 may monitor write command input path 308 via path 320 to determine when a write command has been accepted. Read command counter 338 increments rd_cmd_cnt whenever a read command is accepted by the memory controller (i.e., whenever a read command is loaded into the read command queue). For example, command scheduler 306 may monitor read command input path 310 via path 321 to determine when a read command has been accepted.

Write stall counter 340 increments wr_stall_cnt whenever a write command is stalled from being accepted by the memory controller (e.g., when the write command queue is full). For example, command scheduler 306 may monitor write command queue status signals provided via path 322 to determine when a write command has been stalled. Read stall counter 342 increments rd_stall_cnt whenever a read command is stalled from being accepted by the memory controller (e.g., when the read command queue is full). For example, command scheduler 306 may monitor read command queue status signals provided via path 323 to determine when a read command has been stalled.

Counters 336, 338, 340, and 342 may be implemented as finite counter pairs, where write command counter 336 and read command counter 338 forms the first counter pair, and where write stall counter 340 and read stall counter 342 forms the second counter pair. When one of the counters within the same counter pair saturates (i.e., when one of the counters in the same pair reaches the max count of that counter), both counters within the same pair is divided by two (e.g., by right-shifting both counters by one bit position) to preserve the relative ratio of the counter pair to prevent overflowing the counters.

For example, consider an illustrative scenario in which wr_cmd_cnt is "1111" and rd_cmd_cnt is "0011" (i.e., write command count saturates). In this scenario, both counters 336 and 338 are right-shifted by one bit position such that wr_cmd_cnt is "0111" and rd_cmd_cnt is "0001." As another example, consider another exemplary scenario in which wr_stall_cnt is "0100" and rd_stall_cnt is "1111" (i.e., read stall count saturates). In this scenario, both counters 340 and 342 are right-shifted by one bit position such that wr_stall_cnt is "0010" and rd_stall_cnt is "0111". These examples in which the read/write command and stall counters are four bits wide are merely illustrative. In general, the read/write command and stall counters can have any desired bit width.

Figure 5:
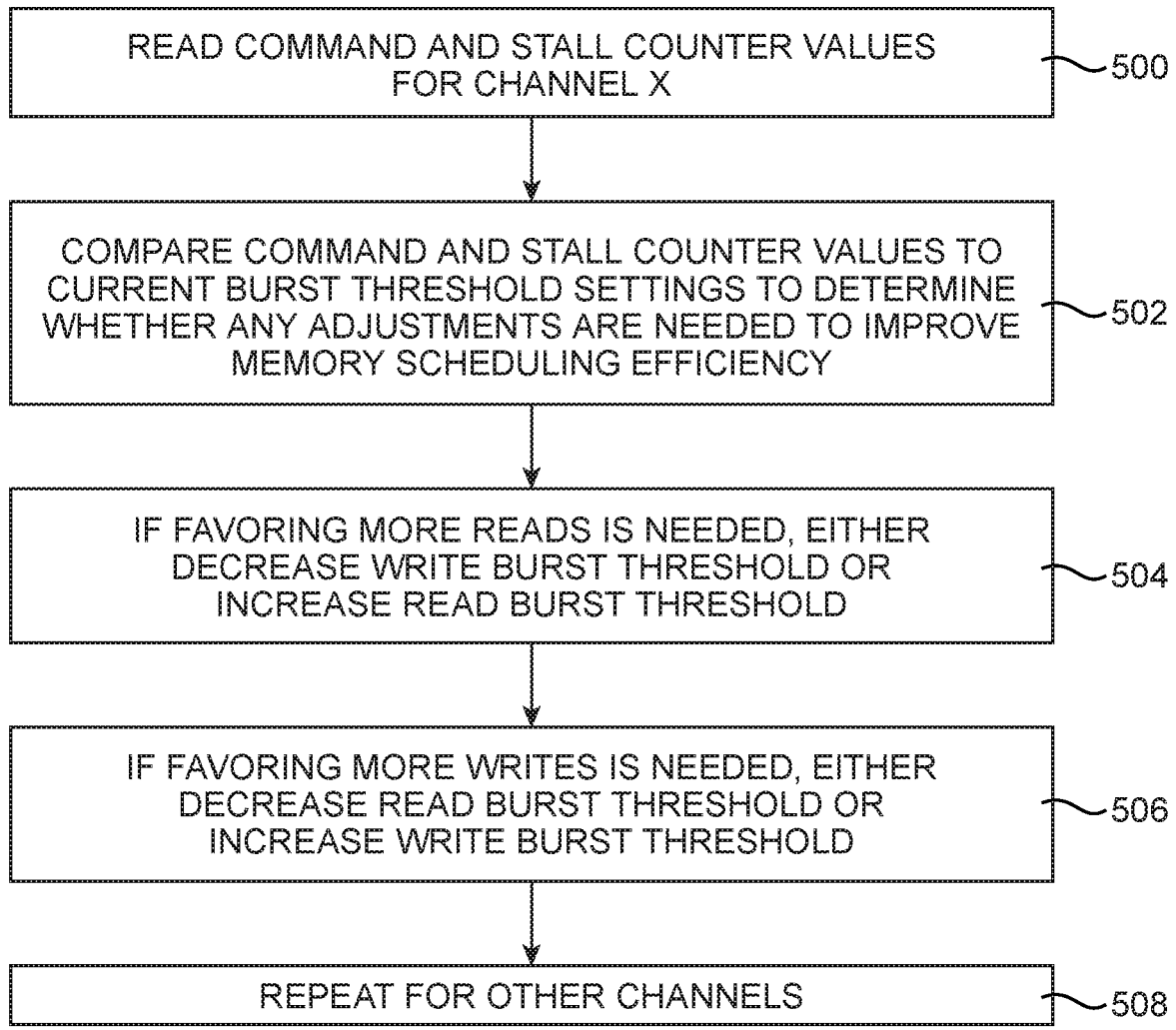
FIG. 5 is a diagram of an illustrative flow chart for operating a memory controller of the type shown in connection with FIGS. 2-4 in accordance with an embodiment.

Counters 336, 338, 340, and 342 may be periodically sampled to determine the optimal read and write burst thresholds that control the major mode finite state machine such as FSM 400 of FIG. 4. The sampling frequency of counters 336, 338, 340, and 342 determines the adaptability rate of the dynamic major mode to changing memory traffic streams. FIG. 5 is a diagram of an illustrative flow chart for operating a memory controller of the type shown in connection with FIGS. 2-4.

At step 500, memory controller 204 may read or sample the command and stall counter values for a given channel X. For example, command scheduler 306 may read or obtain the current wr_cmd_cnt, rd_cmd_cnt, wr_stall_cnt, and rd_stall_cnt.

At step 502, memory controller 204 may compare the command and stall counter values to the current burst threshold settings to determine whether any adjustments are needed to improve memory scheduling efficiency. If favoring more reads is needed, then command scheduler 306 may either decrease the write burst threshold or increase the read burst threshold (step 504). If favoring more writes is needed, then command scheduler 306 may either decrease the read burst threshold or increase the write burst threshold (step 506).

At step 508, steps 500, 502, 504, and 506 may be repeated for another channel (i.e., X may be incremented).

Figure 6A:
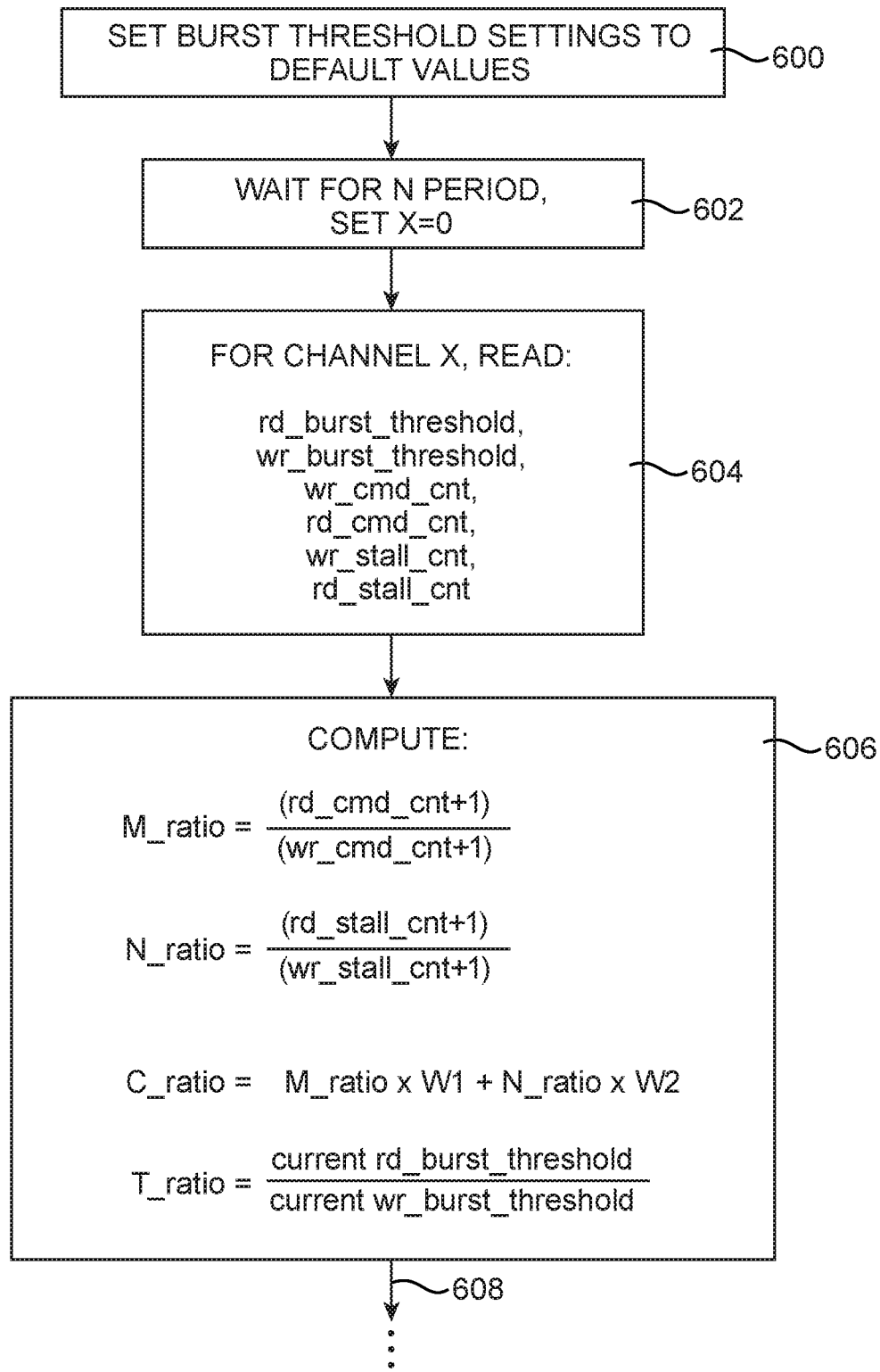
FIGS. 6A-6C are diagrams showing detailed steps for using a memory controller of the type shown in connection with FIGS. 2-5 to perform dynamic in-flight adjustments in accordance with an embodiment.
Figure 6B:
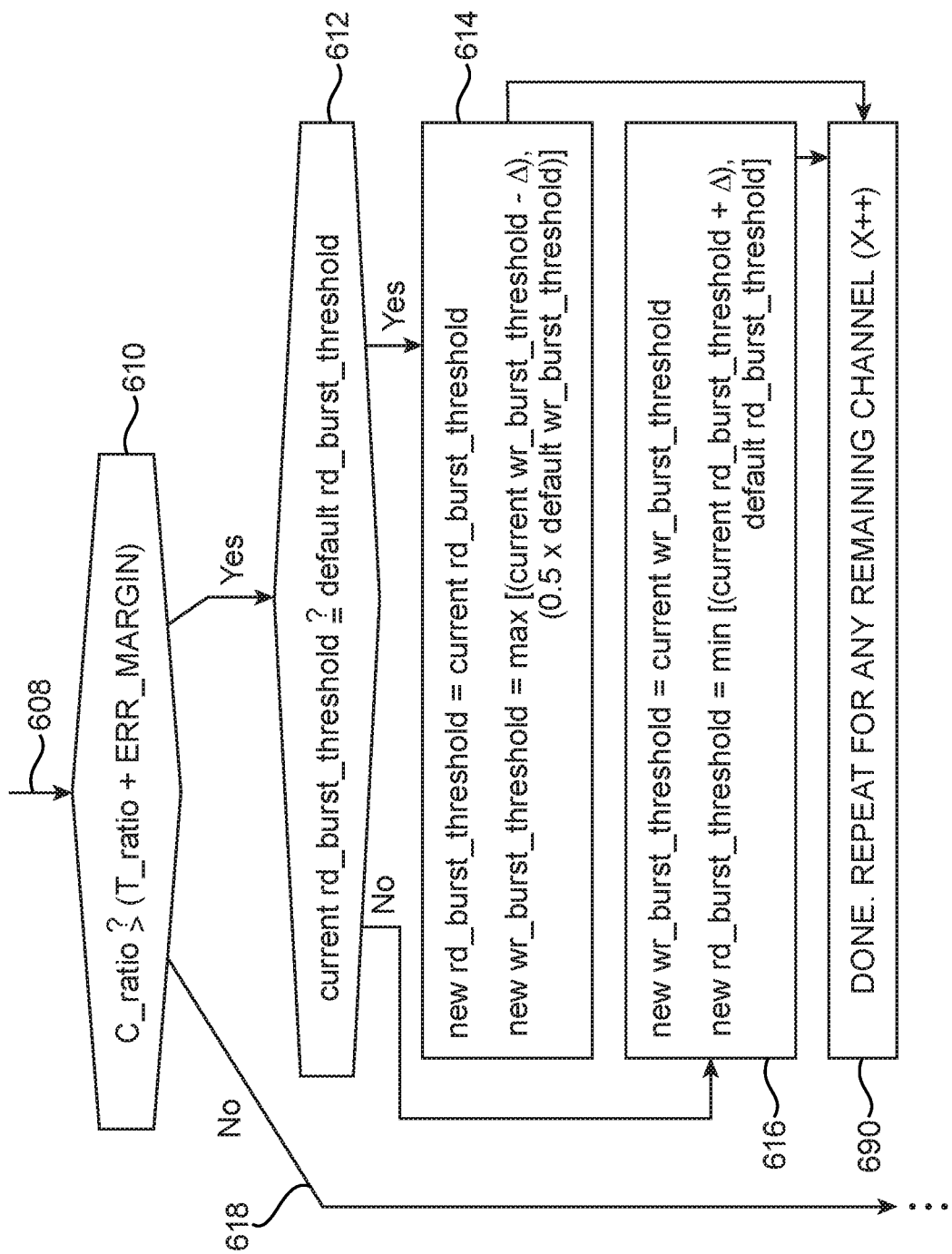
Figure 6C:
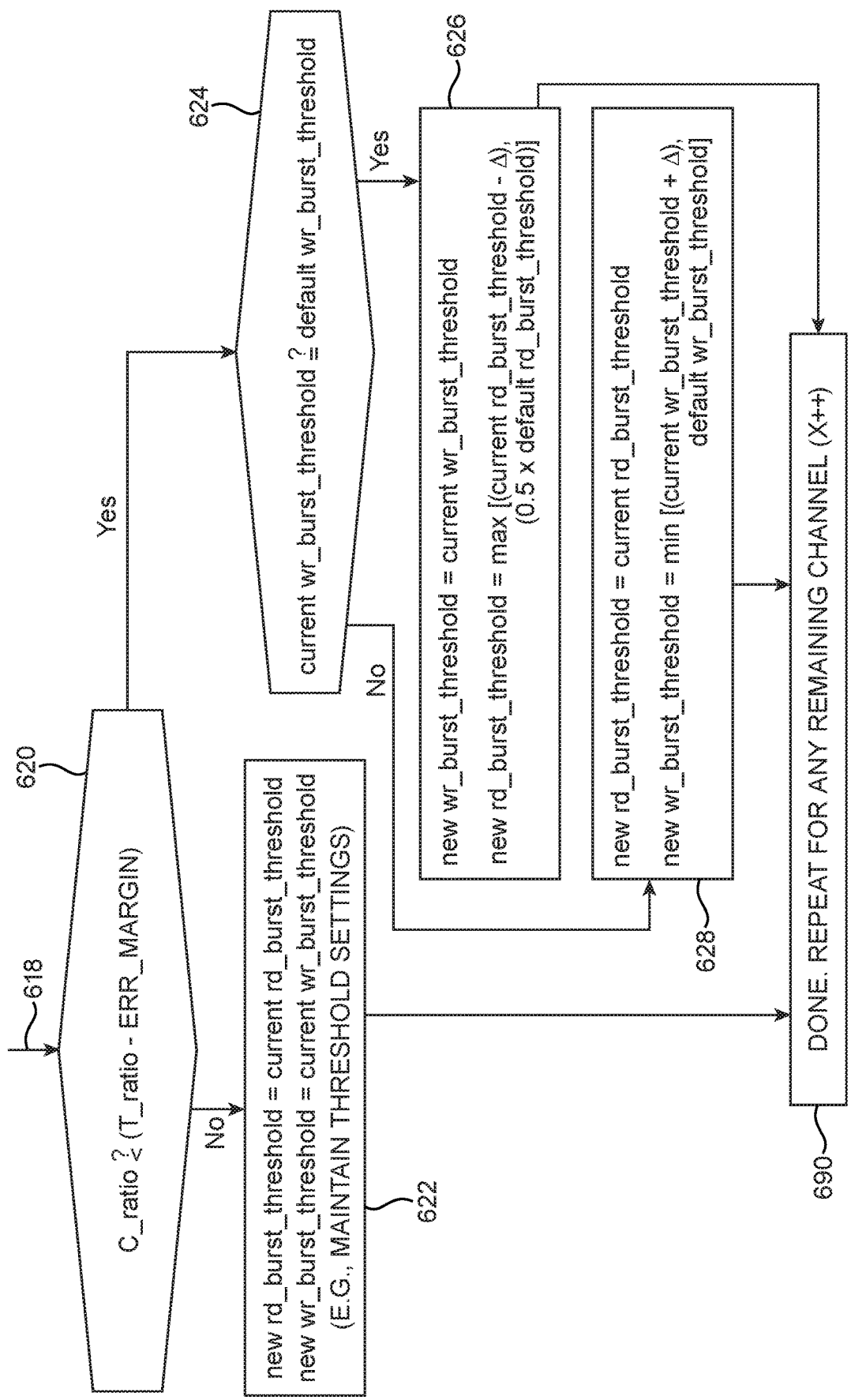

FIGS. 6A-6C are diagrams showing a more detailed illustrative process for using memory controller 204 to perform dynamic in-flight major mode adjustments. At step 600 of FIG. 6A, command scheduler 306 may set the burst threshold settings to default values (i.e., rd_burst_threshold, wr_burst_threshold, and high water mark may be reset to default levels).

At step 602, memory controller 204 may wait for N clock periods. Parameter N can be tuned to control the adaptability rate of the dynamic major mode (e.g., N may be reduced to increase the frequency at which dynamic adjustments are made or may be increased to reduce the frequency at which dynamic adjustments are made). Variable X may be set to zero so that memory controller 204 performs adaptation on the first channel.

At step 604, command scheduler 306 may sample for channel X the read burst threshold setting (rd_burst_threshold), the write burst threshold setting (wr_burst_threshold), the write command count (wr_cmd_cnt), the read command count (rd_cmd_cnt), the write stall count (wr_stall_cnt), and the read stall count (rd_stall_cnt).

At step 606, command scheduler 306 may compute ratios in accordance with the following equations:

$$M\_ratio = \frac{rd\_cmd\_cnt + 1}{wr\_cmd\_cnt + 1} \quad (1)$$

$$N\_ratio = \frac{rd\_stall\_cnt + 1}{wr\_stall\_cnt + 1} \quad (2)$$

$$C\_ratio = M\_ratio * W1 + N\_ratio * W2 \quad (3)$$

$$T\_ratio = \frac{current\ rd\_burst\_threshold}{current\ wr\_burst\_threshold} \quad (4)$$

The "+1" in equations 1 and 2 helps to prevent dividing by zero. Variables W1 and W2 are weighting factors. In particular, W1 is a command weight, whereas W2 is a stall weight. The sum of W1 and W2 should be equal to 1. In general, command weight W1 may be greater than stall weight W2, but W1 can optionally be equal to or less than W2. T_ratio may sometimes be referred to as a major mode read-write ratio or a read-write burst threshold ratio. After step 606, processing may proceed to FIG. 6B via path 608.

As shown in FIG. 6B, step 610 may proceed from path 608. At step 610, command scheduler 306 may determine whether C_ratio computed from equation 3 is greater than the sum of T_ratio computed from equation 4 and an error margin ERR_MARGIN. The ERR_MARGIN value may be between 0 and 0.2 or other suitable amount to avoid over-adjusting the burst threshold levels.

In response to determining that C_ratio is greater than (T_ratio+ERR_MARGIN), which indicates detection of more incoming reads, command scheduler 306 may then determine whether the current read burst threshold is equal to the default read burst threshold (step 612). If the current read burst threshold is equal to the default read burst threshold (e.g., if the read burst threshold is at its max), then the new read burst threshold is set equal to the current read burst threshold (i.e., the read burst threshold level is maintained), whereas the new write burst threshold is set equal to the maximum of the current write burst threshold minus adjustment amount Δ and the product of 0.5 and the default write burst threshold, which decreases the write burst threshold (step 614). Decreasing the write burst threshold helps favor more reads (i.e., to prioritize read requests over write requests). Adjustment amount Δ can be equal to 1-10 or other suitable values to avoid large swings on the burst threshold settings and to optimize efficiency.

If the current read burst threshold is not equal to the default read burst threshold (e.g., if the read burst threshold is not at its max and can therefore be increased), then the new write burst threshold is set equal to the current write burst threshold (i.e., the write burst threshold level is maintained), whereas the new read burst threshold is set equal to the minimum of the current read burst threshold plus adjustment amount Δ and the default read burst threshold, which increases the read burst threshold (step 616). Increasing the read burst threshold also helps favor more reads.

At steps 614 and 616, processing may proceed to step 690. At step 690, the preceding steps in FIG. 6 may be performed for any remaining channel (e.g., by incrementing X).

Referring back to step 610, in response to determining that C_ratio is not greater than (T_ratio+ERR_MARGIN), processing may proceed to FIG. 6C via path 618.

As shown in FIG. 6C, step 610 may proceed from path 608. At step 610, command scheduler 306 may determine whether C_ratio is less than the difference of T_ratio and error margin ERR_MARGIN. In response to determining that C_ratio is less than (T_ratio−ERR_MARGIN), which indicates that more incoming writes are detected, command scheduler 306 may then determine whether the current write burst threshold is equal to the default write burst threshold (step 624).

If the current write burst threshold is equal to the default write burst threshold (e.g., if the write burst threshold is at its max), then the new write burst threshold is set equal to the current write burst threshold (i.e., the write burst threshold level is maintained), whereas the new read burst threshold is set equal to the maximum of the current read burst threshold minus adjustment amount Δ and the product of 0.5 and the default read burst threshold, which decreases the read burst threshold (step 626). Decreasing the read burst threshold helps favor more writes (i.e., to prioritize write requests over read requests).

If the current write burst threshold is not equal to the default write burst threshold (e.g., if the write burst threshold is not at its max and can therefore be increased), then the new read burst threshold is set equal to the current read burst threshold (i.e., the read burst threshold level is maintained), whereas the new write burst threshold is set equal to the minimum of the current write burst threshold plus adjustment amount Δ and the default write burst threshold, which increases the write burst threshold (step 628). Increasing the write burst threshold also helps favor more writes.

Referring back to step 620, in response to determining that C_ratio is not less than (T_ratio−ERR_MARGIN), which indicates that C_ratio is within the error margin, command scheduler 306 may set the new read burst threshold to the current read burst threshold and set the new write burst threshold to the current write burst threshold (i.e., step 622, the burst threshold settings are maintained and no adjustments are made).

After steps 626, 628, and 622, processing may proceed to step 690. At step 690, the preceding steps in FIG. 6 may be performed for any remaining channel (e.g., by incrementing X). Configured and operated in this way, the memory controller is provided with technical improvements, including reduced read/write turnaround time, improved usability for designers of programmable integrated circuits since they no longer need to tune the memory controller according to specific memory traffic patterns unique to their applications, improved adaptability to future enhancements without having to spin silicon, etc.

The process of FIGS. 5 and 6 are merely illustrative and are not intended to limit the present embodiments. At least some of the existing steps may be modified or omitted; some of the steps may be performed in parallel; additional steps may be added or inserted; and the order of certain steps may be reversed or altered.

Figure 7:
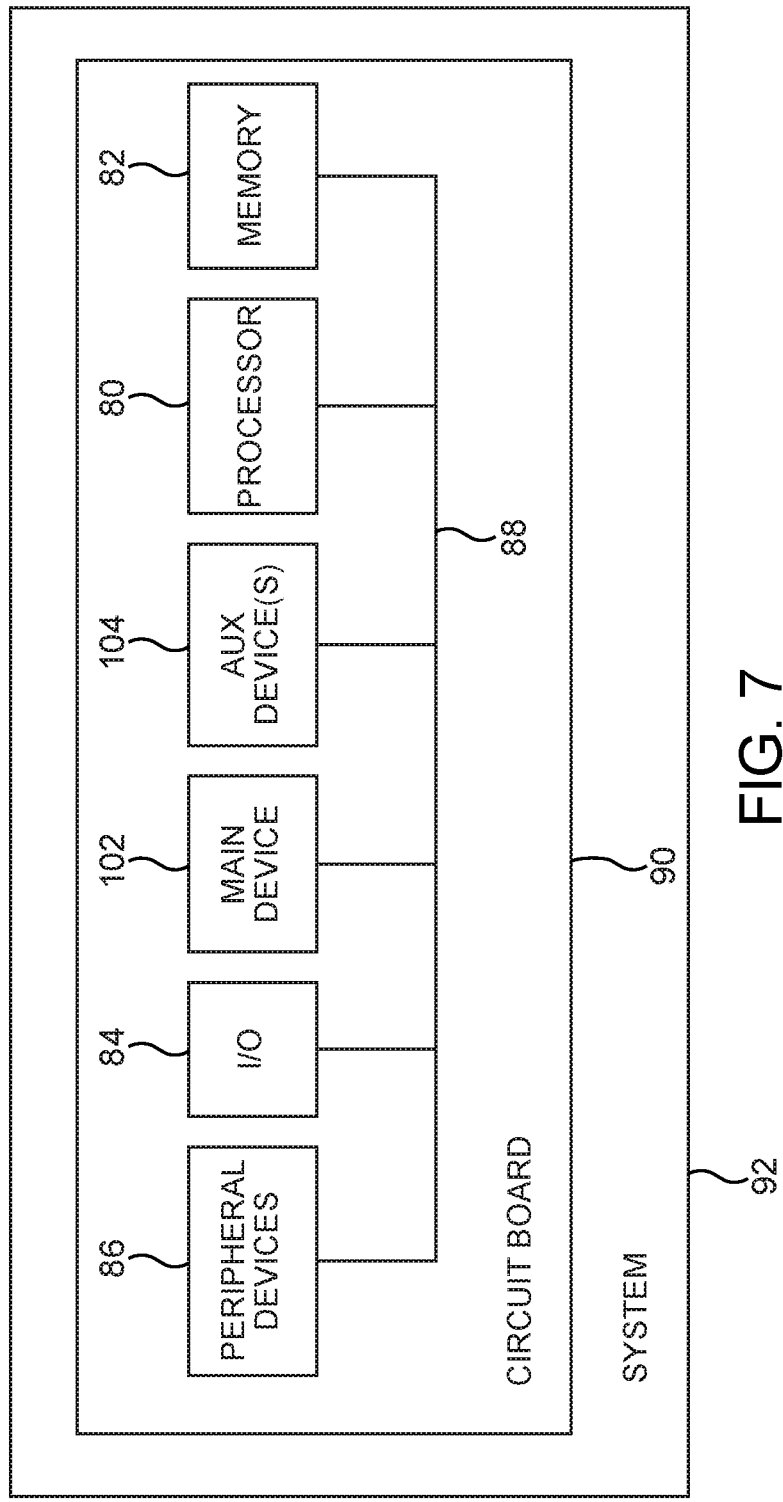
FIG. 7 is a diagram of an illustrative system in which the memory interface circuitry arrangements of the present embodiments may be used.

The foregoing embodiments may be made part of a larger system. FIG. 7 shows a main device 102 (e.g., device 102 that includes memory controller 208 having command scheduler 306) and auxiliary device(s) 104 of the type shown in FIGS. 1-3 in use in data processing system 92. Data processing system 92 may include one or more of the following components: a processor 80 (e.g., a central processing unit or CPU), memory 82 or any suitable type of computer-readable media for storing data or program code, I/O circuitry 84, and peripheral devices 86. These components are coupled together by a system bus 88 and may populate a circuit board 90 that is contained in system 92.

System 92 may be a digital system or a hybrid system that includes both digital and analog subsystems. System 92 may be used in a wide variety of applications as part of a larger computing system, which may include but is not limited to: a datacenter, a computer networking system, a data networking system, a digital signal processing system, a graphics processing system, a video processing system, a computer vision processing system, a cellular base station, a virtual reality or augmented reality system, a network functions virtualization platform, an artificial neural network, an autonomous driving system, a combination of at least some of these systems, and/or other suitable types of computing systems.

The foregoing is merely illustrative of the principles of this invention and various modifications can be made by those skilled in the art. The foregoing embodiments may be implemented individually or in any combination.

What is claimed is:

1. An integrated circuit, comprising:
   a memory controller configured to communicate with an external memory device, wherein the memory controller comprises:
   a write command queue configured to receive write commands;
   a read command queue configured to receive read commands; and
   a command scheduling circuit coupled to the write command queue and the read command queue, wherein the command scheduling circuit is configured to dynamically adjust a read burst threshold setting and a write burst threshold setting based on incoming memory traffic,
   wherein the command scheduling circuit comprises a write command counter circuit configured to generate a write command count value and a read command counter circuit configured to generate a read command count value, and
   wherein the command scheduling circuit is further configured to compare the read and write command count values to the read and write burst threshold settings to determine whether any adjustments to the read and write burst threshold settings are needed.

2. The integrated circuit of claim 1, wherein the command scheduling circuit is configured to compute:
   a first ratio based on the read command count value and the write command count value; and
   a second ratio based on a read stall count value and a write stall count value.

3. The integrated circuit of claim 1, wherein the command scheduling circuit further comprises:
   a write stall counter circuit configured to generate a write stall count value; and
   a read stall counter circuit configured to generate a read stall count value.

4. The integrated circuit of claim 3, wherein the command scheduling circuit is further configured to compare a first metric computed based on the read and write command count values and the read and write stall count values with a second metric computed based on the read and write burst threshold settings.

5. The integrated circuit of claim 1, wherein the command scheduling circuit is further configured to either decrease the write burst threshold setting or to increase the read burst threshold setting in response to determining that the incoming memory traffic includes more read commands.

6. The integrated circuit of claim 5, wherein the command scheduling circuit is further configured to either decrease the read burst threshold setting or to increase the write burst threshold setting in response to determining that the incoming memory traffic includes more write commands.

7. An integrated circuit, comprising:
   a memory controller configured to communicate with an external memory device, wherein the memory controller comprises:
   a write command queue configured to receive write commands;
   a read command queue configured to receive read commands; and
   a command scheduling circuit in communication with the write command queue and the read command queue, wherein the command scheduling circuit is configured to dynamically adjust a read burst threshold setting and a write burst threshold setting based on incoming memory traffic,
   wherein the command scheduling circuit is further configured to generate a write command count value, a read command count value, a write stall count value, and a read stall count value,
   wherein the command scheduling circuit is configured to compute:
   a first ratio based on the read command count value and the write command count value;
   a second ratio based on the read stall count value and the write stall count value;
   a third ratio based on the first and second ratios; and
   a fourth ratio based on the read burst threshold setting and the write burst threshold setting.

8. The integrated circuit of claim 7, wherein the command scheduling circuit is further configured to compare the third ratio with the fourth ratio to determine whether any adjustments to the read and write burst threshold settings are needed.

9. A method of operating an integrated circuit, the method comprising:
using a memory controller in the integrated circuit to communicate with an external memory device;
with a write command queue in the memory controller, receiving write commands;
with a read command queue in the memory controller, receiving write commands;
with a command scheduling circuit in the memory controller, dynamically adjusting a read burst threshold and a write burst threshold by monitoring an incoming memory stream;
with the command scheduling circuit, keeping track of a write command count, a read command count, a write stall count, and a read stall count;
computing a first ratio based on the read command count and the write command count; and
computing a second ratio based on the read stall count and the write stall count.

10. The method of claim 9, further comprising:
in response to determining that the incoming memory stream has more reads, configuring the command scheduling circuit to either decrease the write burst threshold or to increase the read burst threshold.

11. The method of claim 10, further comprising:
in response to determining that the incoming memory stream has more writes, configuring the command scheduling circuit to either decrease the read burst threshold or to increase the write burst threshold.

12. The method of claim 9, further comprising:
computing a third ratio based on the first ratio and the second ratio; and
computing a fourth ratio based on the read burst threshold and the write burst threshold.

13. The method of claim 12, further comprising:
comparing the third ratio with the fourth ratio to determine whether the incoming memory stream has more reads or writes.

14. The method of claim 13, further comprising:
in response to determining that the incoming memory stream has more reads, configuring the command scheduling circuit to either decrease the write burst threshold or to increase the read burst threshold; and
in response to determining that the incoming memory stream has more writes, configuring the command scheduling circuit to either decrease the read burst threshold or to increase the write burst threshold.

15. The method of claim 14, wherein configuring the command scheduling circuit to decrease the write burst threshold comprises using a maximum function, and wherein configuring the command scheduling circuit to increase the read burst threshold comprises using a minimum function.

16. A system, comprising:
a memory module; and
an integrated circuit die operable to communicate with the memory module, wherein the integrated circuit die comprises:
a memory controller comprising a command scheduler configured to dynamically update burst threshold settings by monitoring live memory traffic arriving at the memory controller,
wherein the command scheduler is configured to monitor the live memory traffic by keeping track of a command count pair and a stall count pair, and
wherein the command scheduler is further configured to compare a first metric computed based on the command count pair and the stall count pair with a second metric computed based on the burst threshold settings.

17. The system of claim 16, wherein the command scheduler is further configured to favor read commands in response to determining that the live memory traffic includes more reads commands and to favor write commands in response to determining that the live memory traffic includes more write commands.

18. The system of claim 17, wherein the command scheduler is configured to favor the read commands by either decreasing a write burst threshold or increasing a read burst threshold, and wherein the command scheduler is configured to favor the write commands by either decreasing the read burst threshold or increasing the write burst threshold.

19. The system of claim 16, wherein the command count pair comprises a write command count value generated by a write command counter circuit and a read command count value generated by a read command counter circuit.

20. The system of claim 19, wherein the stall count pair comprises a write stall count value generated by a write stall counter circuit and a read stall count value generated by a read stall counter circuit.

21. The system of claim 16, wherein the memory controller is part of a selected one of: a datacenter, a computer networking system, a data networking system, a digital signal processing system, a graphics processing system, a video processing system, a computer vision processing system, a cellular base station, a virtual reality system, an augmented reality system, a network functions virtualization platform, an artificial neural network, and an autonomous driving system.

* * * * *